(12) United States Patent
Mariyani et al.

(10) Patent No.: US 12,302,417 B2
(45) Date of Patent: May 13, 2025

(54) IDENTIFICATION OF FRAUDULENT NETWORK DATA SESSIONS

(71) Applicant: T-Mobile USA, Inc., Bellevue, WA (US)

(72) Inventors: Anil Kumar Mariyani, Ashburn, VA (US); Ramesh Kalathur, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 504 days.

(21) Appl. No.: 17/855,541

(22) Filed: Jun. 30, 2022

(65) Prior Publication Data

US 2024/0008101 A1 Jan. 4, 2024

(51) Int. Cl.
*H04W 76/10* (2018.01)
*H04M 15/00* (2006.01)
*H04W 60/04* (2009.01)
*H04W 84/04* (2009.01)

(52) U.S. Cl.
CPC ........... *H04W 76/10* (2018.02); *H04M 15/66* (2013.01); *H04W 60/04* (2013.01); *H04W 84/042* (2013.01)

(58) Field of Classification Search
CPC ... H04W 76/10; H04W 60/04; H04W 84/042; H04M 15/66
See application file for complete search history.

(56) References Cited

U.S. PATENT DOCUMENTS

| | | | |
|---|---|---|---|
| 7,623,498 | B2 | 11/2009 | Lundström |
| 7,881,288 | B2 | 2/2011 | Noldus et al. |
| 7,917,139 | B2 | 3/2011 | Jiang |
| 8,639,248 | B2 | 1/2014 | Giustina et al. |
| RE45,545 | E | 6/2015 | Sung et al. |
| 9,467,908 | B2 | 10/2016 | Jeong et al. |
| 9,497,614 | B1 | 11/2016 | Ridel et al. |
| 9,888,375 | B2 | 2/2018 | Zisimopoulos et al. |
| 9,930,591 | B2 | 3/2018 | Won et al. |
| 9,992,670 | B2 | 6/2018 | Pudney et al. |
| 10,984,128 | B1 * | 4/2021 | Hoffer .................... G16B 50/30 |

(Continued)

FOREIGN PATENT DOCUMENTS

| | | |
|---|---|---|
| CN | 101188862 B | 6/2010 |
| CN | 101730188 B | 2/2013 |

(Continued)

*Primary Examiner* — Jael M Ulysse
(74) *Attorney, Agent, or Firm* — Perkins Coie LLP (57) ABSTRACT

Systems, methods, and devices that relate to the improvement of controlling impersonating attacks from foreign networks are disclosed. In one example aspect, a method for wireless communication includes receiving, by a policy control node, a request message from a first network node. The request message comprising a first identifier indicating a first public land mobile network associated with an establishment of a bearer or a session for a terminal device. The method includes transmitting a query to a second network node in the core network to obtain a second identifier of a second public land mobile network associated with a registration of the terminal device. The method also includes accepting or rejecting, by the policy control node, the establishment of the bearer or the session for the terminal based on whether the first identifier matches the second identifier.

20 Claims, 9 Drawing Sheets

(56) References Cited

U.S. PATENT DOCUMENTS

| | | | |
|---|---|---|---|
| 11,070,974 B2 | 7/2021 | Dodd-noble et al. | |
| 11,647,006 B2* | 5/2023 | D'Alessandro | H04L 63/0464 |
| | | | 713/176 |
| 2006/0135160 A1* | 6/2006 | Jiang | H04W 8/04 |
| | | | 455/435.1 |
| 2007/0072587 A1* | 3/2007 | Della-Torre | H04L 63/1408 |
| | | | 455/410 |
| 2009/0005033 A1 | 1/2009 | Wijayanathan et al. | |
| 2011/0171953 A1* | 7/2011 | Faccin | H04W 48/08 |
| | | | 455/426.1 |
| 2012/0208487 A1* | 8/2012 | Tiwari | H04W 12/106 |
| | | | 455/445 |
| 2015/0026786 A1* | 1/2015 | Alexander | H04W 12/128 |
| | | | 726/7 |
| 2015/0078245 A1 | 3/2015 | Anchan | |
| 2016/0165507 A1* | 6/2016 | Keller | H04W 48/18 |
| | | | 370/331 |
| 2017/0126411 A1* | 5/2017 | Piqueras Jover | H04L 9/3247 |
| 2018/0310162 A1* | 10/2018 | Kim | H04W 12/69 |
| 2019/0200264 A1* | 6/2019 | Kim | H04W 76/22 |
| 2019/0357116 A1* | 11/2019 | Huang-Fu | H04W 48/02 |
| 2020/0021993 A1* | 1/2020 | Yang | H04L 63/123 |
| 2020/0053568 A1* | 2/2020 | Filart | H04L 63/1466 |
| 2020/0275506 A1* | 8/2020 | Niemi | H04W 76/18 |
| 2021/0029628 A1 | 1/2021 | Kim et al. | |
| 2021/0044979 A1* | 2/2021 | Vivanco | H04W 12/122 |
| 2021/0051577 A1* | 2/2021 | Won | H04W 76/18 |
| 2022/0338016 A1* | 10/2022 | Goldfarb | H04W 60/04 |
| 2023/0247430 A1* | 8/2023 | Mohan Raj | H04W 12/72 |
| | | | 726/26 |

FOREIGN PATENT DOCUMENTS

| | | |
|---|---|---|
| CN | 103037400 B | 9/2016 |
| CN | 103460735 B | 2/2018 |
| CN | 104244219 B | 4/2018 |
| CN | 104685935 B | 1/2019 |
| CN | 105101176 B | 6/2019 |
| CN | 106454993 B | 6/2020 |
| CN | 110505663 B | 3/2021 |
| CN | 108024314 B | 7/2021 |
| CN | 109922472 B | 10/2021 |
| CN | 111565385 B | 12/2021 |
| EP | 1495652 B1 | 3/2011 |
| EP | 2445244 B1 | 5/2016 |
| EP | 2725831 B1 | 4/2018 |
| JP | 4881314 B2 | 12/2011 |
| JP | 5290415 B2 | 6/2013 |
| JP | 2014523706 A | 9/2014 |
| JP | 5950943 B2 | 6/2016 |
| JP | 6258316 B2 | 12/2017 |
| KR | 101639423 B1 | 7/2016 |
| KR | 101684699 B1 | 12/2016 |
| KR | 101769846 B1 | 8/2017 |
| KR | 20180021630 A | 3/2018 |
| KR | 20180082163 A | 7/2018 |
| KR | 20190082897 A | 7/2019 |
| KR | 102064377 B1 | 2/2020 |
| KR | 102103320 B1 | 4/2020 |
| KR | 102172468 B1 | 10/2020 |
| WO | 0013454 A1 | 3/2000 |
| WO | 2010059122 A2 | 5/2010 |
| WO | 2017166165 A1 | 10/2017 |
| WO | 2018035694 A1 | 3/2018 |
| WO | 2018175498 A1 | 9/2018 |
| WO | 2020185949 A2 | 9/2020 |

* cited by examiner

IDENTIFICATION OF FRAUDULENT NETWORK DATA SESSIONS

BACKGROUND

Mobile communication technologies are moving the world toward an increasingly connected and networked society. Ensuring secure communications and protecting users from data leaks or service disruptions are important aspects of providing reliable communication services to customers.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Systems, methods, and devices that relate to mitigating impersonating attacks from foreign networks are disclosed. By leveraging the existing Public Land Mobile Network (PLMN) information during subscriber's recent registration activities, the home network can determine if an incoming data-plane session request is suspicious and should be rejected, thereby protecting the subscriber from staggering roaming charges for such data service consumption.

In wireless communications, network security protects the underlying networking infrastructure from unauthorized access, misuse, or theft. It involves creating a secure infrastructure for devices, applications, and users to work in a safe manner. Networks are subject to attacks from malicious sources. Attacks can come from passive intruders who intercept data traveling through the network or active intruders who initiate disruptions to the network's operations.

Impersonation is one type of attacks where a malicious actor/attacker impersonates subscribers' traffic via a rogue packet data context. Subscribers who have roamed into foreign networks that are operated by partner operators are susceptible to such attacks. When a roamer attempts to establish a connection in a Visiting PLMN (VPLMN), its International Mobile Subscriber Identity (IMSI) is communicated to the VPLMN. An attacker that has gained access to the core network of the VPLMN can obtain the IMSI and generate traffic on behalf of any subscriber whose IMSI is known by the VPLMN. There is no locational validation in the user plane, so the attacker can establish data sessions in the user plane to consume data service once control-plane authentication is bypassed.

One way to prevent such impersonation attacks is to implement a General Packet Radio Service (GPRS) Tunneling Protocol (GTP) firewall to disallow packets that come from suspicious locations and/or packets that are potentially unauthorized. However, doing so requires the GTP firewall to monitor the signaling flows, including user registration and session establishment. The GTP firewall also needs to correlate the monitored signaling flows to determine whether the user is supposed to send a data session establishment request from a foreign network, leading to additional processing complexity and signaling delays.

Figure 1:
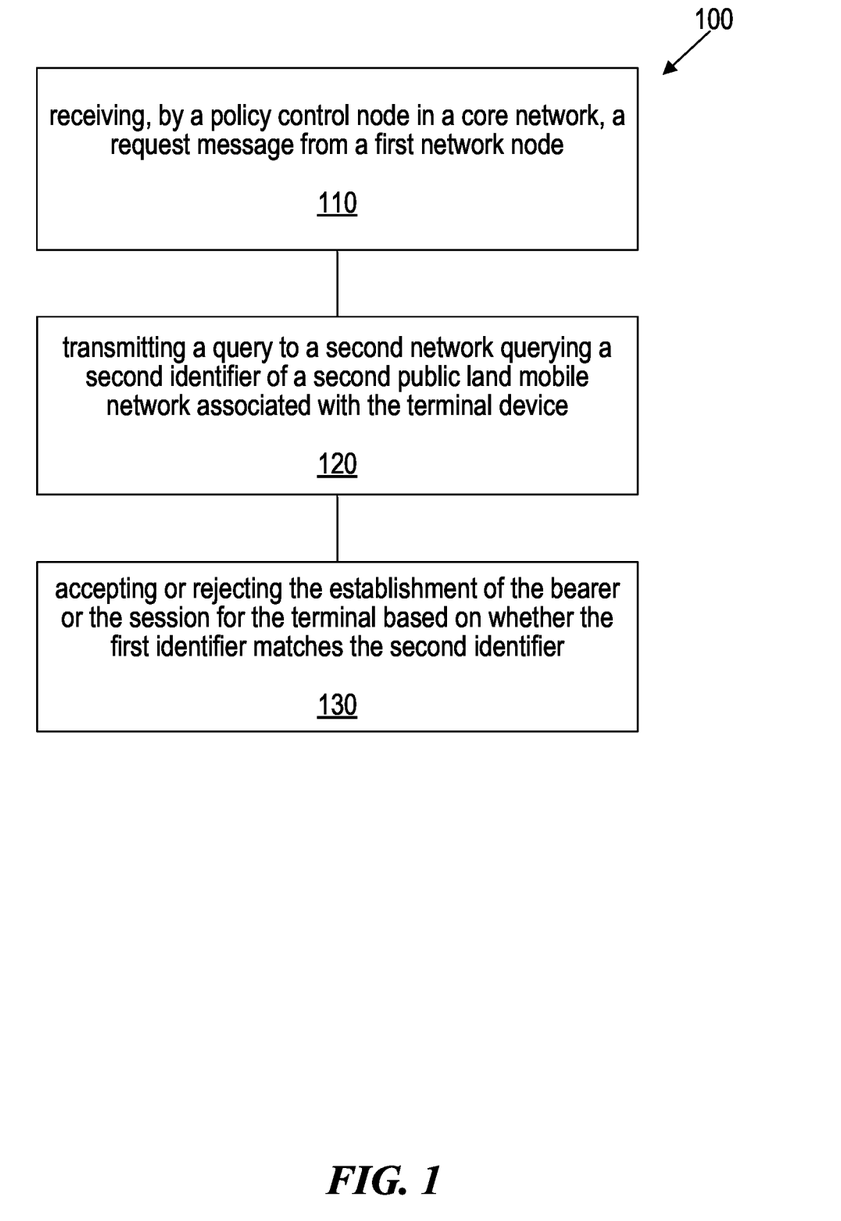
FIG. 1 is a flowchart representation of a process for wireless communication in accordance with one or more embodiments of the present technology.

This patent document discloses techniques that can be implemented in various embodiments to prevent impersonation attacks with minimal complexity and overhead. The PLMN information during subscriber's recent registration activities can be used by the home network to determine if an incoming data-plane session request is suspicious and should be rejected. FIG. 1 is a flowchart representation of a process for wireless communication in accordance with one or more embodiments of the present technology. The process 100 includes, at operation 110, receiving, by a policy control node in a core network, a request message from a first network node. The request message is associated with an establishment of a bearer or a session for a terminal device. The request message includes a first identifier indicates a public land mobile network associated with the establishment of the bearer or the session. For example, if the request comes from an impersonating terminal device, the request message needs to include the identifier of the foreign network (e.g., VPLMN ID). As another example, the request can include the identifier of a network node in the VPLMN (e.g., a gateway server or a session management function in the VPLMN). Based on the identifier of the network node, the identifier of the foreign network (e.g., VPLMN ID) can be derived.

The process 100 includes, at operation 120, transmitting, by the policy control node, a query to a second network querying a second identifier of a second public land mobile network associated with the terminal device. For example, the second identifier is the stored PLMN ID associated with the registration of the terminal device. The process 100 also includes, at operation 130, accepting or rejecting, by the policy control node, the establishment of the bearer or the session for the terminal based on whether the first identifier matches the second identifier. Details of the process 100 are further explained in the following examples for the LTE network system and the 5G network system.

Figure 2:
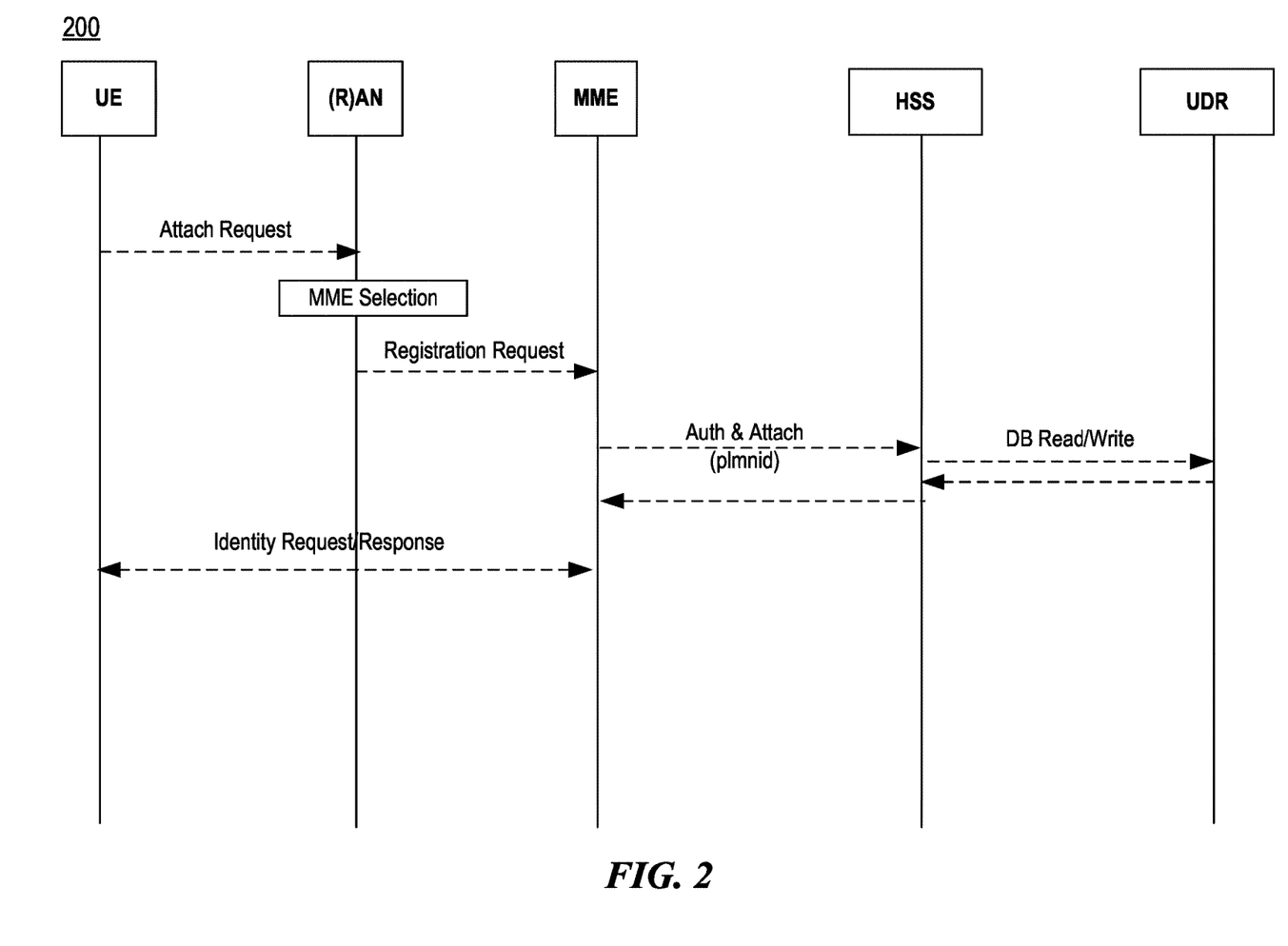
FIG. 2 illustrate an example User Equipment (UE) attach procedure in the Long-Term-Evolution (LTE) network system in accordance with one or more embodiments of the present technology.

FIG. 2 illustrate an example UE attach procedure 200 in the LTE network system in accordance with one or more embodiments of the present technology. In this procedure, the UE transmits an attach request to the access node (AN) or the radio access node (RAN). The AN/RAN selects a Mobility Management Entity (MME) and forwards the attach request to the MME. The MME transmits a request (e.g., an Authentication Information Request, AIR, or an Update Location Request, ULR) to the Home Subscriber Server (HSS) to fetch authentication data from HSS so as to authenticate the UE and/or verify the locational information. The request includes the identifier of the serving PLMN. For example, for an initial attach in the home network, the identifier indicates the Home PLMN (HPLMN). The HSS queries the Unified Data Repository (UDR) to obtain user subscription information and responds to MME. A default bearer for the attach procedure is also created to route user plane data (not shown in FIG. 2).

Figure 3:
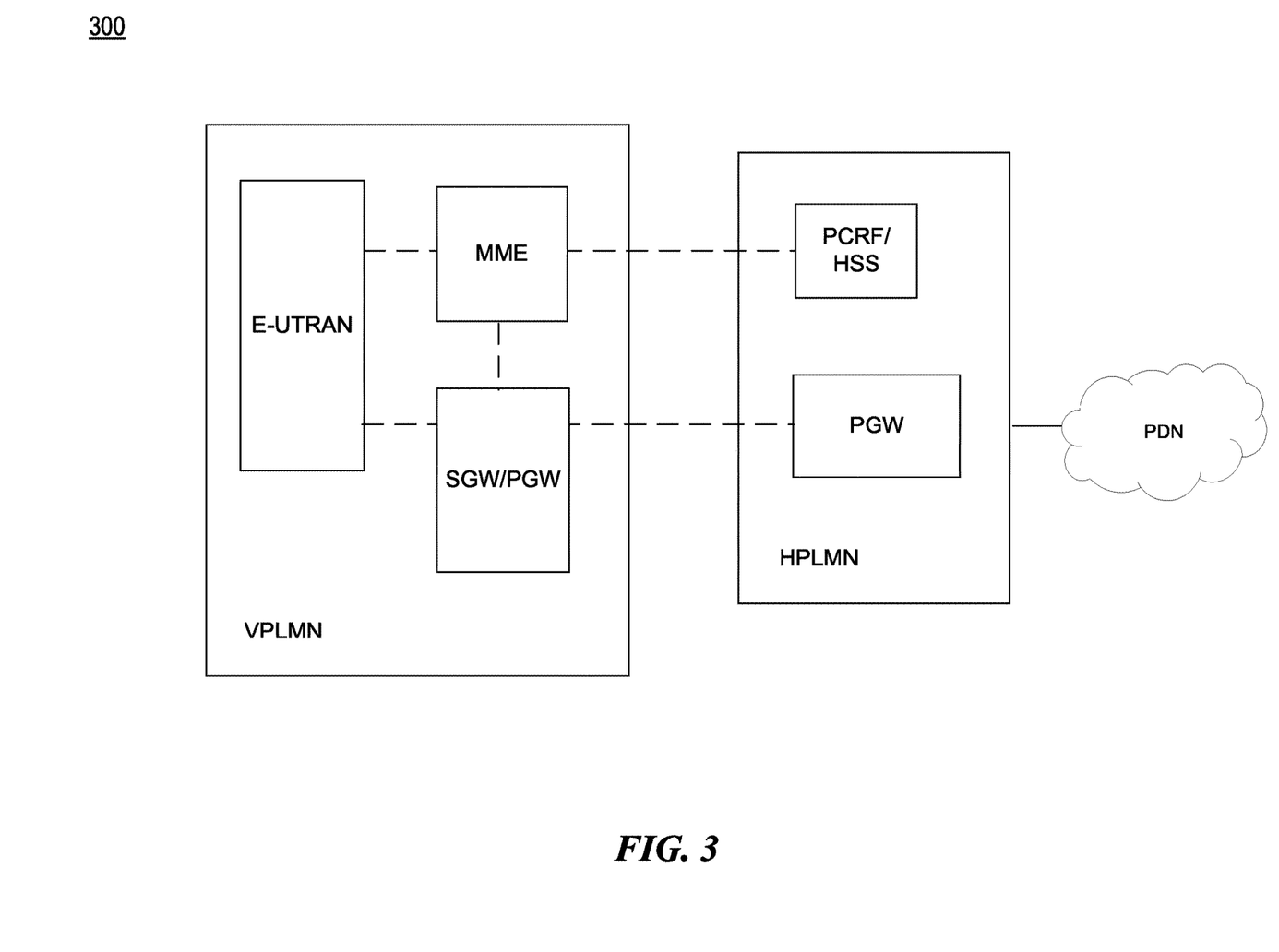
FIG. 3 illustrates a roaming LTE system architecture in home routed scenario in accordance with one or more embodiments of the present technology.
Figure 4:
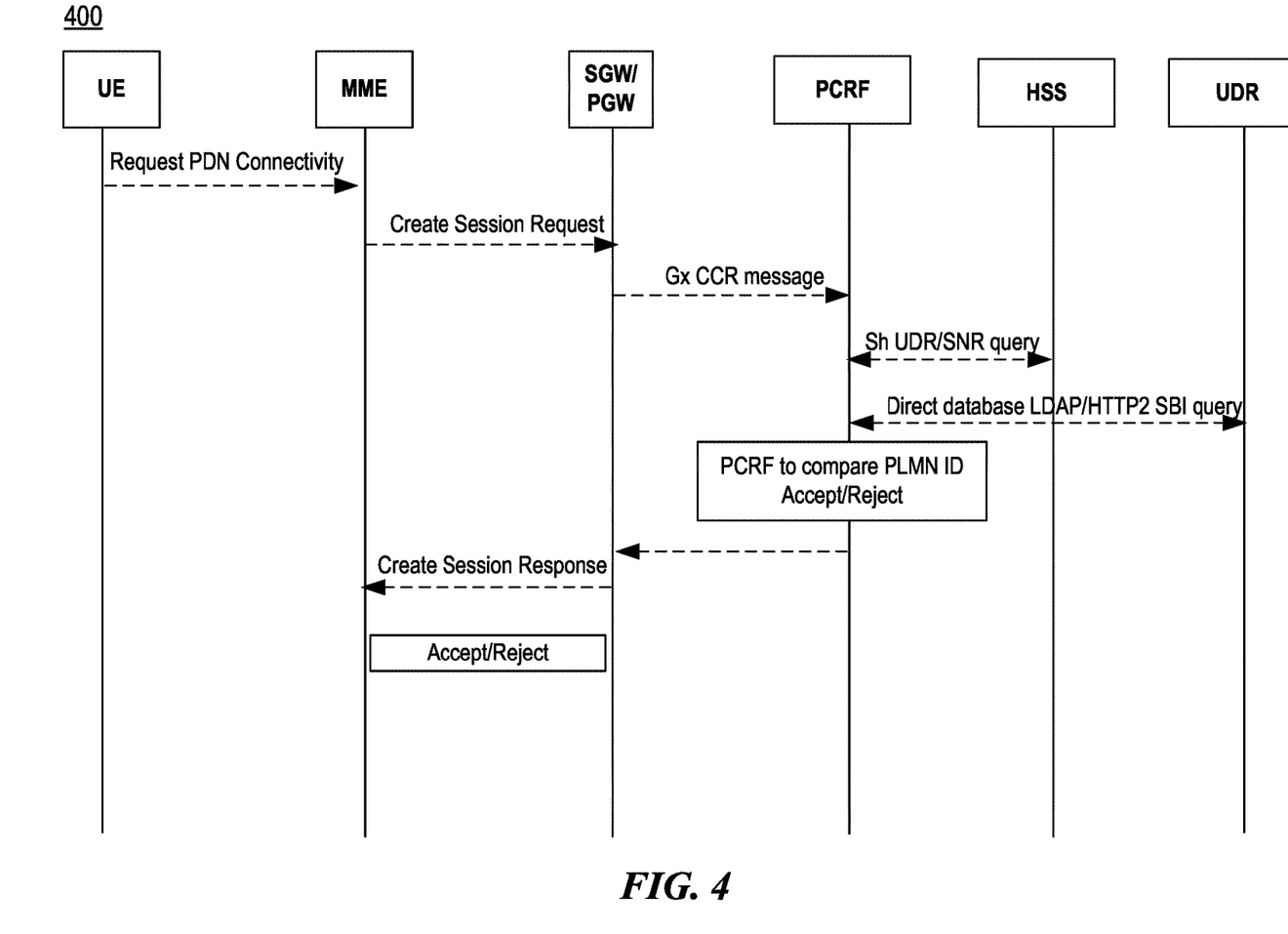
FIG. 4 illustrates an example session establishment flow in the LTE network system in accordance with one or more embodiments of the present technology.

Besides the default bearer, the UE can also request PDN connectivity by transmitting a Create Session Request. When a roaming partner's core network is compromised, the UE may be impersonated as a roaming UE requesting PDN connectivity. FIG. 3 illustrates a roaming LTE system architecture 300 in home routed scenario in accordance with one or more embodiments of the present technology. A roaming user is in communication with the Evolved Universal Mobile Telecommunication Service (UMTS) Radio Access Network (E-UTRAN) in the VPLMN. The MME, the Serving Gateway (SGW), and the Public Data Network (PDN) Gateway (PGW) in the VPLMN are in communication with the PGW, the Policy and Charging Rules Function (PCRF), and the HSS in the HPLMN to allow the user to get data services. FIG. 4 illustrates an example session establishment flow 400 in the LTE network system in accordance with one or more embodiments of the present technology. The impersonating UE (e.g., the attacker) in the VPLMN requests PDN connectivity. The MME transmits a Create Session Request to the gateway(s) (e.g., SGW/PGW). The gateway(s) provide the PCRF with the serving PLMN ID so that the PCRF can determine if there is a discrepancy between UE registration/attachment and the session establishment. In this example, the PLMN ID of the VPLMN is included in the Credit Control Request (CCR) on the Gx interface. The Gx CCR message can be initiated by the PGW (e.g., the roaming PGW) towards the PCRF. The PCRF can query UDR to retrieve the PLMN ID associated with the UE registration/attachment. The PCRF then compare the two values to determine whether there is a mismatch. If the PLMN IDs do not match, it means that the create session request comes from an impersonating UE in a different PLMN. The PCRF then feedback this information to the gateway(s) so that the gateway(s) can reject the create session request if needed. It is noted that similar approach can also be used for the establishment of the default bearer during the UE attach procedure if the establishment request for the default bearer comes from a suspicious foreign network.

Figure 5:
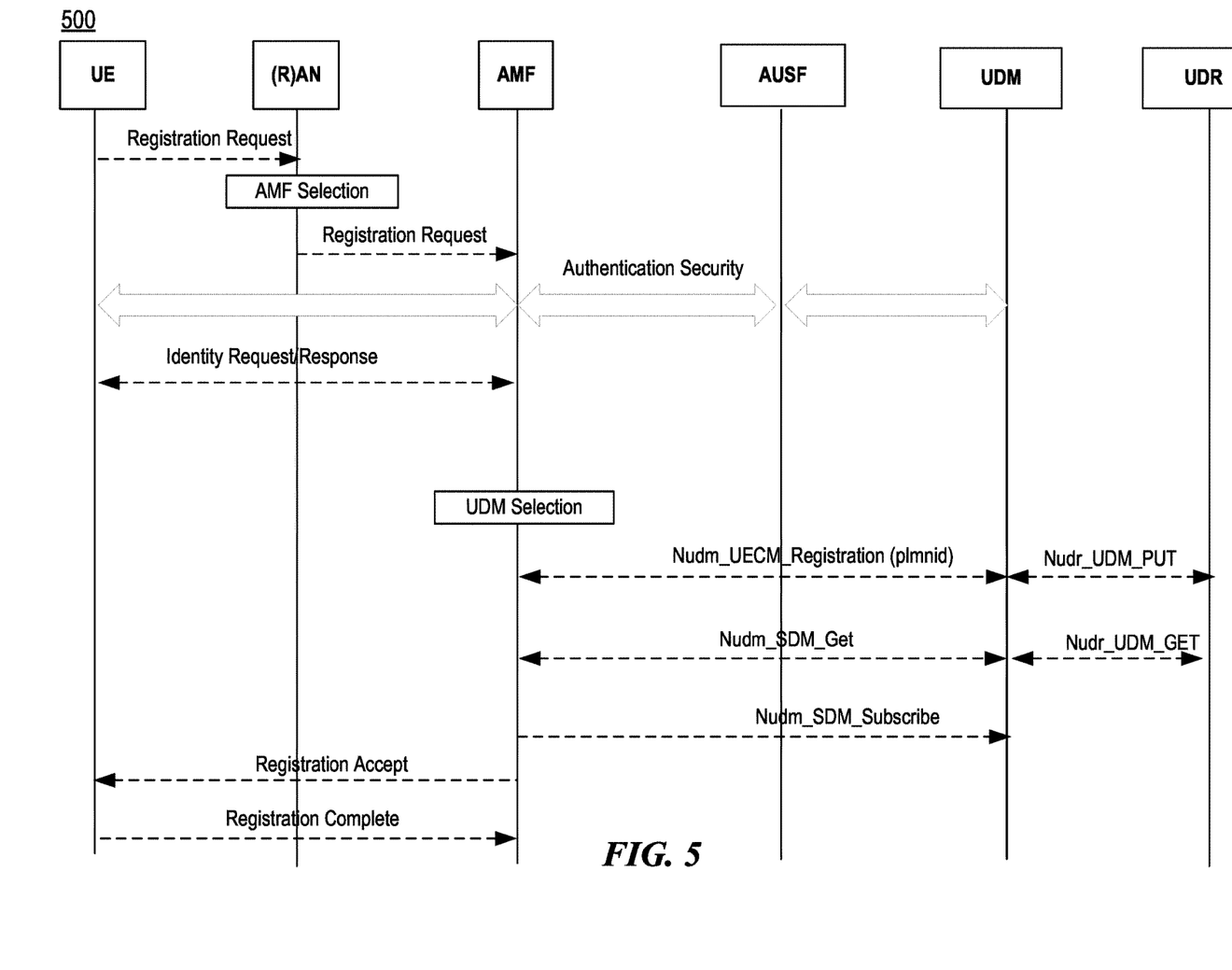
FIG. 5 illustrates an example UE registration procedure in the Fifth-Generation (5G) network system in accordance with one or more embodiments of the present technology.

FIG. 5 illustrates an example UE registration procedure 500 in the 5G network system in accordance with one or more embodiments of the present technology. A valid UE in a home network transmits a registration request to the AN/RAN. The AN/RAN selects an access and mobility management function (AMF) and forwards the registration request to the AMF. The AMF can decide to initiate UE authentication by invoking an authentication server function (AUSF). The AUSF selects a Unified Data Management (UDM) and gets authentication data from UDM. The AMF may also initiate an identity request procedure to retrieve the Permanent Equipment Identifier (PEI) from the UE. The AMF selects a UDM and registers with the UDM using Uudm_UECM_Registration for the access to be registered. The Uudm_UECM_Registration message includes the identifier of the serving PLMN. For example, in this case, the HPLMN ID is included in this message. The AMF retrieves roaming information using Nudm_SDM_Get. After a successful response is received, the AMF subscribes to be notified using Nudm_SDM_Subscribe when the data requested is modified.

Figure 6:
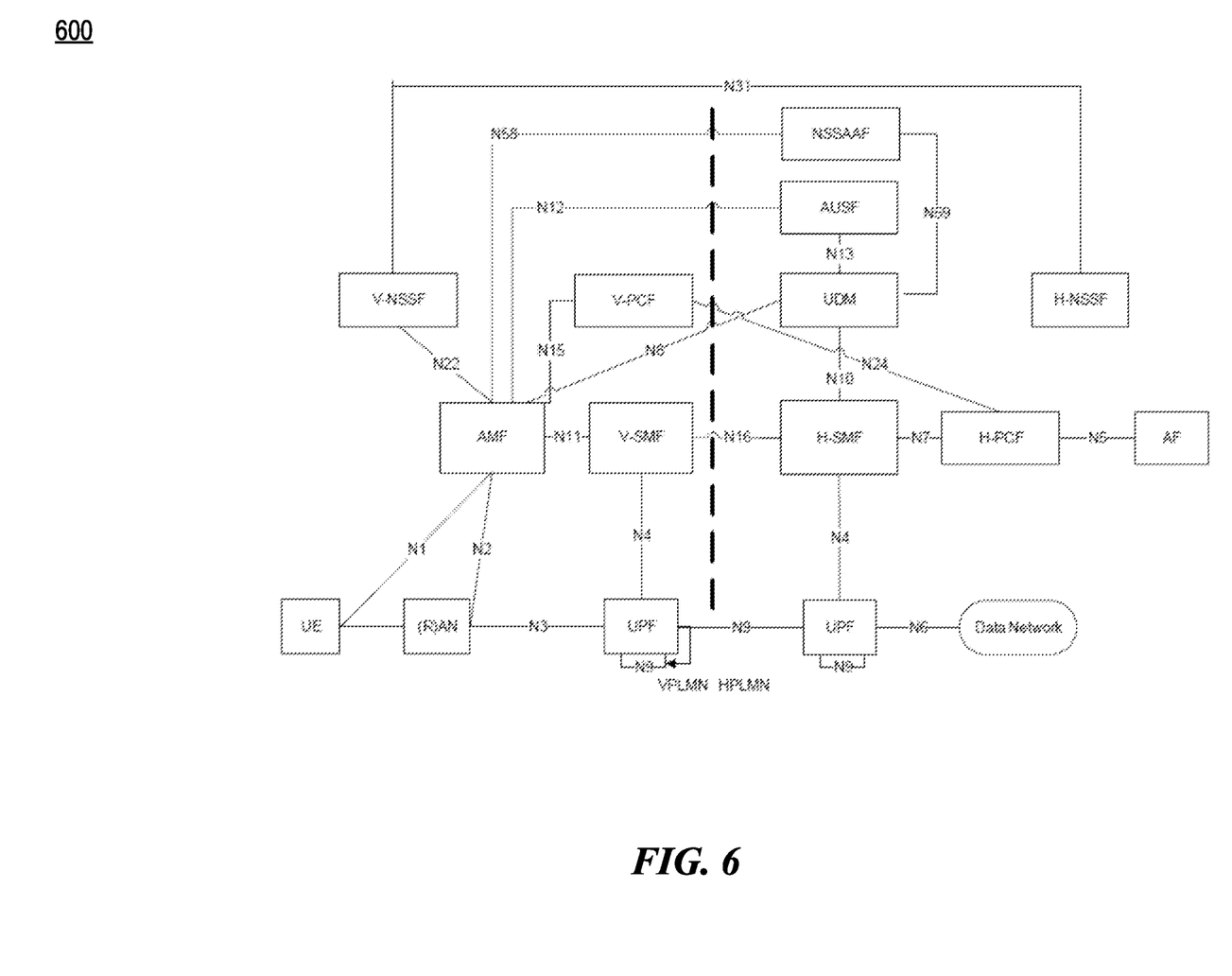
FIG. 6 illustrates a roaming 5G system architecture in home routed scenario in accordance with one or more embodiments of the present technology.
Figure 7:
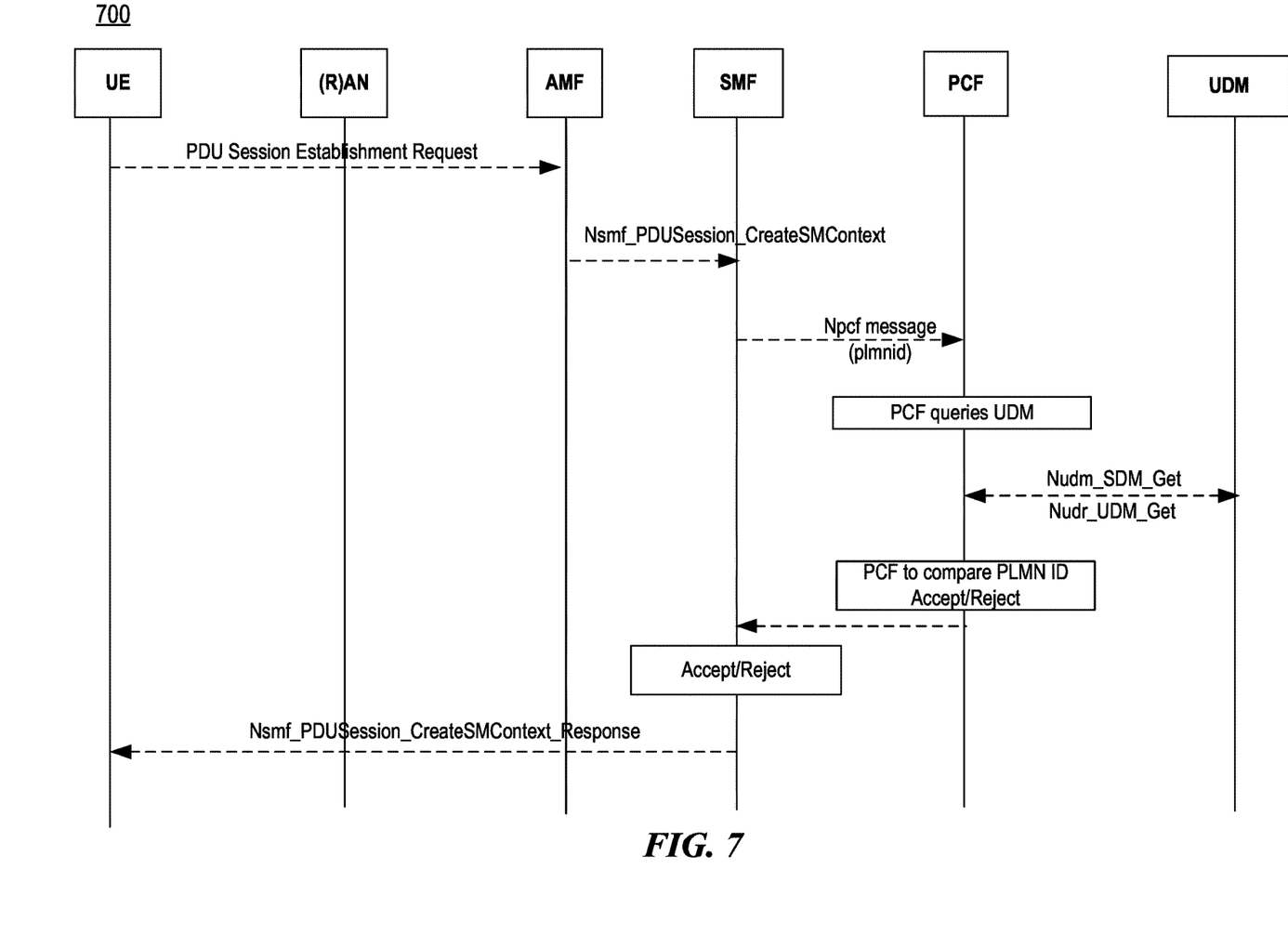
FIG. 7 illustrates an example session establishment procedure in the 5G network system in accordance with one or more embodiments of the present technology.

After the UE completes the registration in the home network, the UE can initiate a Protocol Data Unit (PDU) session establishment to start consuming user plane data. However, if a roaming partner's core network is compromised, the UE may be impersonated as a roaming UE requesting to establish a PDU session from a foreign network. FIG. 6 illustrates a roaming 5G system architecture 600 in home routed scenario in accordance with one or more embodiments of the present technology. In the home-routed roaming scenario, the visited Policy Control (PCF) is not involved, and the home PCF (h-PCF) interacts with the home SMF (h-SMF). FIG. 7 illustrates an example session establishment procedure 700 in the 5G network system in accordance with one or more embodiments of the present technology. The impersonating UE in the VPLMN (e.g., the attacker) initiates a PDU session establishment request to the AMF. The AMF transmits a message to the SMF (e.g., Nsmf_PDUSession_CreateSMContext message) for the PDU establishment. At PDU Session establishment. SMF also requests the creation of a corresponding SM Policy Association with the PCF. For example, the SMF sends a message to the PCF and provides relevant parameters about the PDU Session to the PCF. The message can be a Npcf_SMPolicyControl_Create message or a Npcf_PolicyAuthorization_Create message with SMF functioning as an Application Function (AF). The SMF can provide the PCF with the serving PLMN ID so that the PCF can determine if there is a discrepancy between UE registration and PDU session establishment. For example, the PCF can query UDM to retrieve the PLMN ID associated with the UE registration. The PCF then compare the two values to determine whether there is a mismatch. If the PLMN IDs do not match, it means that the session establishment request comes from an impersonating UE in a different PLMN. The PCF then feedback this information to the SMF so that the SMF can reject the PDU session establishment request if needed.

In both the LTE and 5G examples discussed above, the roaming partners can be required to provide the VPLMN ID during the data session establishment. For example, as discussed above, the serving PLMN ID can be a mandatory field in the Npcf_SMPolicyControl_Create message or the Npcf_PolicyAuthorization_Create message to allow the home network to determine the originating network for the data session establishment request.

Alternatively, or in addition, the PGW and/or the SMF in the home network can determine the VPLMN based on the network nodes identifiers in the partner network (e.g., identifier for the gateway node the visiting SMF, v-SMF ID, in the request message from the v-SMF, or identifiers of the gateway node(s) in other messages). Based on this information, the policy control node can derive VPLMN information, and compare the stored VPLMN information associated with the UE registration with the VPLMN information associated with the data session establishment, thereby determining whether the session request comes from a valid source.

In some embodiments, a valid UE that has been registered in the home network roams into another partner network (e.g., VPLMN A). The UE can perform the registration/attach procedure as depicted in FIGS. 2 and 5 as a roaming UE. Upon successful registration, the HSS/AUSF can store the serving PLMN ID (e.g., VPLMN A) in UDM/UDR. When the impersonating UE (e.g., the attacker) initiates a session establishment request in a different partner network (e.g., VPLMN B), similar procedures as depicted in FIGS. 4 and 7 can be adopted to reject such suspicious requests.

It is thus appreciated that the disclosed techniques can be implemented to improve security control for impersonating attacks from foreign networks. The disclosed techniques add minimal signaling overhead to the existing session establishment procedures and does not introduce much processing complexity as compared to the other approaches (e.g., GTP firewall).

Wireless Communications System

Figure 8:
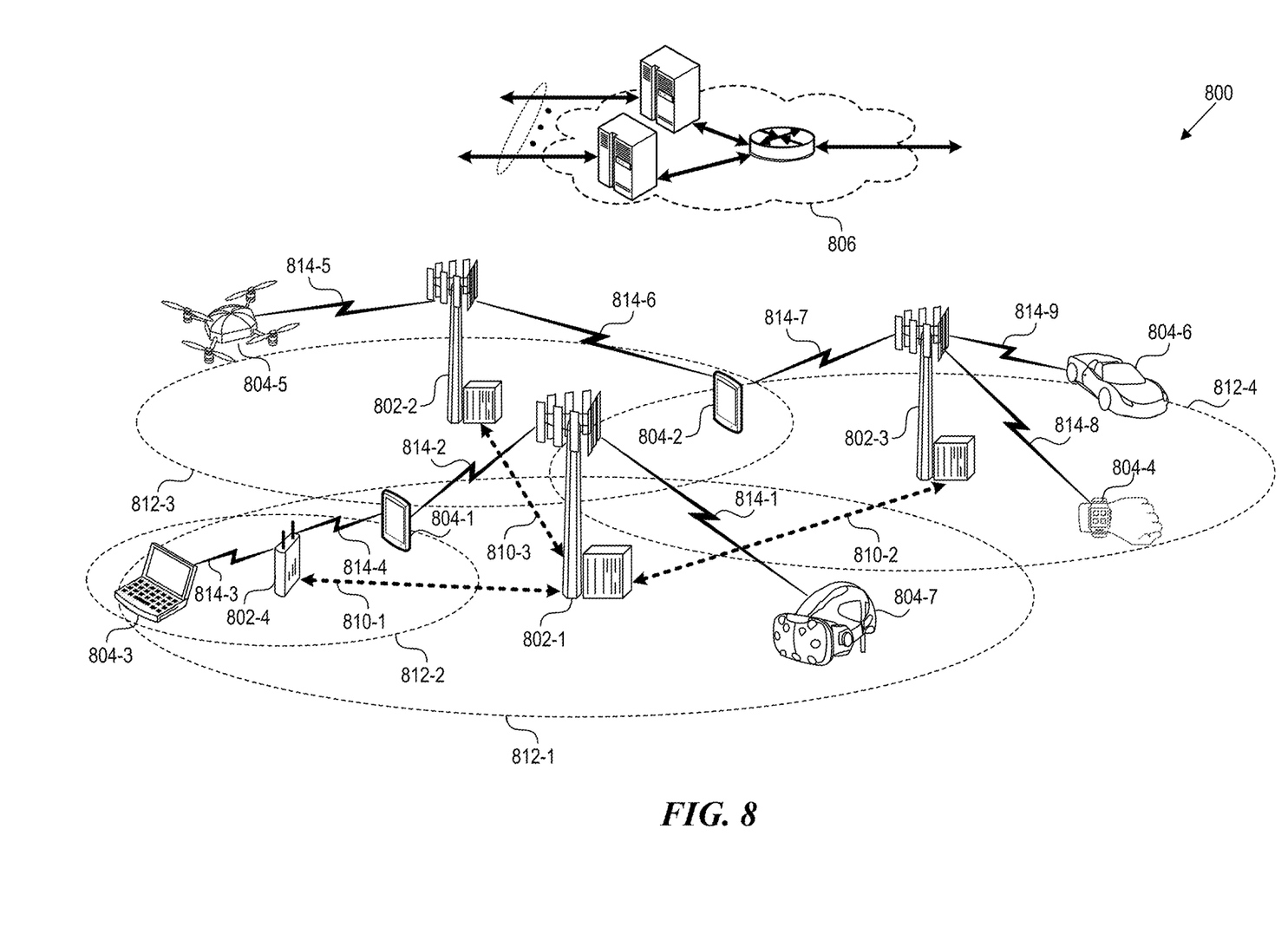
FIG. 8 is a diagram that illustrates a wireless telecommunication network in which aspects of the disclosed technology are incorporated.

FIG. 8 is a diagram that illustrates a wireless telecommunication network 800 ("network 800") in which aspects of the disclosed technology are incorporated. The network 800 includes base stations 802-1 through 802-4 (also referred to individually as "base station 802" or collectively as "base stations 802"). A base station is a type of network access node (NAN) that can also be referred to as a cell site, a base transceiver station, or a radio base station. The network 800 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 800 formed by the network 800 also include wireless devices 804-1 through 804-7 (referred to individually as "wireless device 804" or collectively as "wireless devices 804") and a core network 806. The wireless devices 804-1 through 804-7 can correspond to or include network entities capable of communication using various connectivity standards. For example, a 5G communication channel can use millimeter wave (mmW) access frequencies of 28 GHz or more. In some implementations, the wireless device 804 can operatively couple to a base station 802 over a long-term evolution/long-term evolution-advanced (LTE/LTE-A) communication channel, which is referred to as a 4G communication channel.

The core network 806 provides, manages, and controls security services, user authentication, access authorization, tracking, Internet Protocol (IP) connectivity, and other access, routing, or mobility functions. The base stations 802 interface with the core network 806 through a first set of backhaul links (e.g., S1 interfaces) and can perform radio configuration and scheduling for communication with the wireless devices 804 or can operate under the control of a base station controller (not shown). In some examples, the base stations 802 can communicate with each other, either directly or indirectly (e.g., through the core network 806), over a second set of backhaul links 810-1 through 810-3 (e.g., X1 interfaces), which can be wired or wireless communication links.

The base stations 802 can wirelessly communicate with the wireless devices 804 via one or more base station antennas. The cell sites can provide communication coverage for geographic coverage areas 812-1 through 812-4 (also referred to individually as "coverage area 812" or collectively as "coverage areas 812"). The geographic coverage area 812 for a base station 802 can be divided into sectors making up only a portion of the coverage area (not shown). The network 800 can include base stations of different types (e.g., macro and/or small cell base stations). In some implementations, there can be overlapping geographic coverage areas 812 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 800 can include a 5G network and/or an LTE/LTE-A or other network. In an LTE/LTE-A network, the term eNB is used to describe the base stations 802, and in 5G new radio (NR) networks, the term gNBs is used to describe the base stations 802 that can include mmW communications. The network 800 can thus form a heterogeneous network in which different types of base stations provide coverage for various geographic regions. For example, each base station 802 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 800 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 804 and the base stations 802 or core network 806 supporting radio bearers for the user plane data. At the Physical (PHY) layer, the transport channels are mapped to physical channels.

Wireless devices can be integrated with or embedded in other devices. As illustrated, the wireless devices 804 are distributed throughout the system, where each wireless device 804 can be stationary or mobile. For example, wireless devices can include handheld mobile devices 804-1 and 804-2 (e.g., smartphones, portable hotspots, tablets, etc.); laptops 804-3; wearables 804-4; drones 804-5; vehicles with wireless connectivity 804-6; head-mounted displays with wireless augmented reality/virtual reality (ARNR) connectivity 804-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 804-1, 804-2, 804-3, 804-4, 804-5, 804-6, and 804-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 800 equipment at the edge of a network 800 including macro eNBs/gNBs, small cell eNBs/gNBs, relay base stations, and the like. A wireless device can also communicate with other wireless devices either within or outside the same coverage area of a base station via device-to-device (D2D) communications.

The communication links 814-1 through 814-9 (also referred to individually as "communication link 814" or collectively as "communication links 814") shown in network 800 include uplink (UL) transmissions from a wireless device 804 to a base station 802, and/or downlink (DL) transmissions from a base station 802 to a wireless device 804. The downlink transmissions can also be called forward link transmissions while the uplink transmissions can also be called reverse link transmissions. Each communication link 814 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 814 can transmit bidirectional communications using frequency division duplex (FDD) (e.g., using paired spectrum resources) or Time division duplex (TDD) operation (e.g., using unpaired spectrum resources). In some implementations, the communication links 814 include LTE and/or mmW communication links.

In some implementations of the network 800, the base stations 802 and/or the wireless devices 804 include multiple antennas for employing antenna diversity schemes to improve communication quality and reliability between base stations 802 and wireless devices 804. Additionally or alternatively, the base stations 802 and/or the wireless devices 804 can employ multiple-input, multiple-output (MIMO) techniques that can take advantage of multi-path environments to transmit multiple spatial layers carrying the same or different coded data.

Computer System

Figure 9:
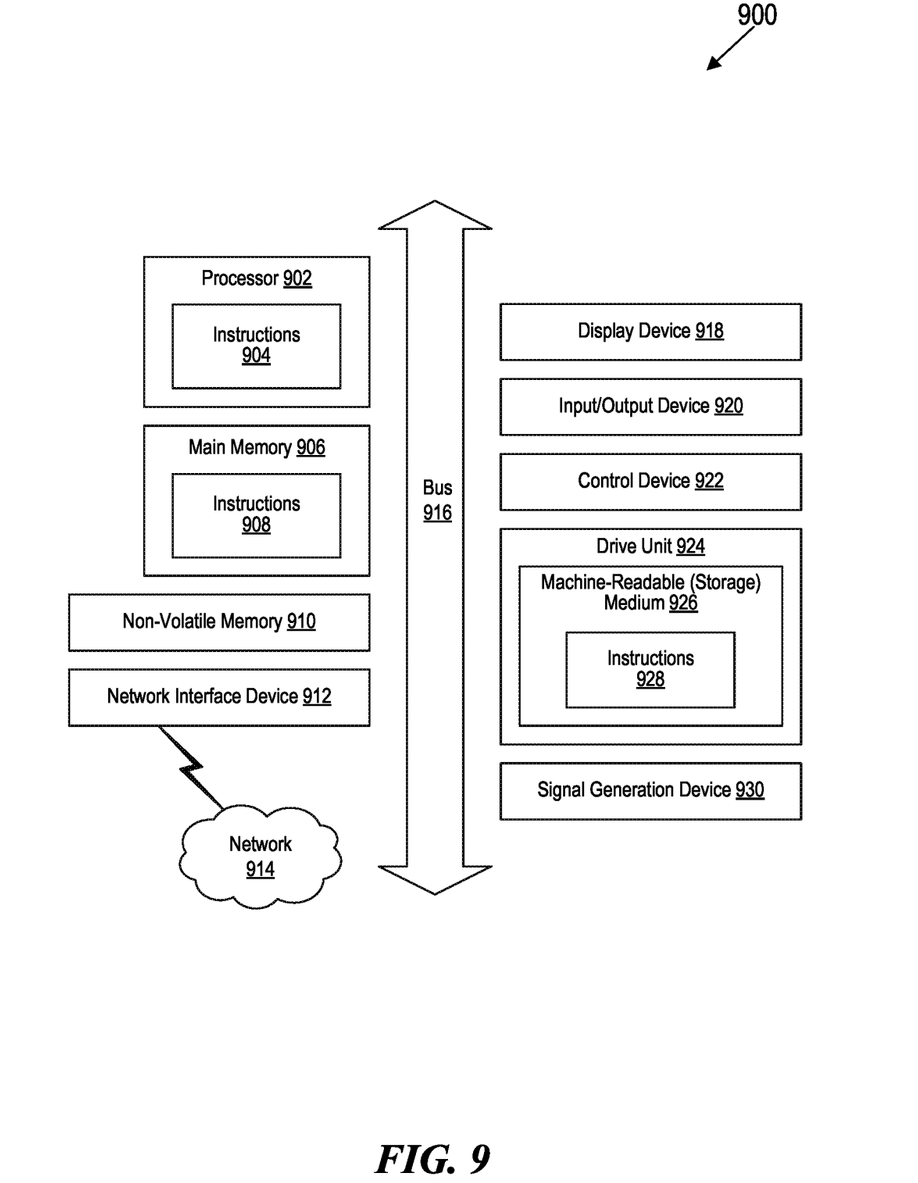
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:
1. A system for wireless communication, comprising:
a policy control node in a home public land mobile network, and
a data management node in the home public land mobile network in communication with the policy control node,
wherein the policy control node is configured to:

receive a message from a network node in a visiting public land mobile network, wherein the message is associated with an establishment of a bearer or a session for a device that impersonates a terminal device in the home public land mobile network, the message comprising a first identifier indicating the visiting public land mobile network associated with the establishment of the bearer or the session;

transmit a query to the data management node to obtain an identifier of the home public land mobile network associated with a registration of the terminal device; and reject the establishment of the bearer or the session for the device that impersonates the terminal device in the home public land mobile network upon determining that the identifier indicating the visiting public land mobile network is different from the identifier of the home public land mobile network.

2. The system of claim 1, wherein the home public land mobile network comprises a Long-Term Evolution (LTE) network, the system further comprising:

a gateway server in the home public land mobile network, wherein the policy control node is configured to receive the message from the network node in the visiting public land mobile network via the gateway server.

3. The system of claim 1, wherein the home public land mobile network comprises a Fifth-Generation (5G) network, the system further comprising:

a session management function (SMF) node in the home public land mobile network, wherein the policy control node is configured to receive the message from the network node in the visiting public land mobile network via the SMF node.

4. The system of claim 1, wherein the first identifier comprises a visiting public land mobile network identifier (VPLMN ID).

5. The system of claim 1, wherein the message comprises a Npcf_PolicyAuthorization_Create message or a Npcf_SMPolicyControl_Create message.

6. A method for wireless communication, comprising:

receiving, by a policy control node in a core network, a request message from a first network node, wherein the request message is associated with an establishment of a bearer or a session for a terminal device, the request message comprising a first identifier indicating a first public land mobile network associated with the establishment of the bearer or the session;

transmitting, by the policy control node, a query to a second network node in the core network to obtain a second identifier of a second public land mobile network associated with a registration of the terminal device; and accepting or rejecting, by the policy control node, the establishment of the bearer or the session for the terminal device based on whether the first identifier matches the second identifier.

7. The method of claim 6, wherein the core network comprises a Long-Term-Evolution core network, and wherein the first network node comprises a gateway server node.

8. The method of claim 6, wherein the core network comprises a Fifth-Generation (5G) core network, and wherein the first network node comprises a Session Management Function (SMF) node.

9. The method of claim 6, wherein the first public land mobile network is a visiting public land mobile network (VPLMN) from which the request message originates, and wherein the second public land mobile network is a home public land mobile network (HPLMN) of the terminal device.

10. The method of claim 6, wherein the first public land mobile network is a first visiting public land mobile network (VPLMN) from which the request message originates, and wherein the second public land mobile network is a second visiting public land mobile network (VPLMN) that the terminal device has roamed into.

11. The method of claim 6, wherein the first identifier comprises an identifier for the first public land mobile network, and wherein the request message comprises a Npcf_PolicyAuthorization_Create message or a Npcf_SMPolicyControl_Create message.

12. The method of claim 6, wherein the first identifier comprises an identifier of a network node in the first public land mobile network.

13. The method of claim 6, wherein the second network node comprises a unified data repository (UDR) node or a unified data management (UDM) node.

14. A device for wireless communication in a core network, comprising one or more processors configured to:

receive a request message from a first network node, wherein the request message is associated with an establishment of a bearer or a session for a terminal device, the request message comprising a first identifier indicating a first public land mobile network associated with the establishment of the bearer or the session;

transmit a query to a second network node in the core network querying a second identifier of a second public land mobile network associated with a registration of the terminal device; and accept or reject the establishment of the bearer or the session for the terminal device based on whether the first identifier matches the second identifier.

15. The device of claim 14, wherein the device is implemented as a Policy and Charging Rules Function (PCRF) node in a Long-Term Evolution wireless communication system.

16. The device of claim 14, wherein the device is implemented as a Policy Control Function (PCF) node in a Fifth-Generation wireless communication system.

17. The device of claim 14, wherein the first public land mobile network is a visiting public land mobile network (VPLMN) from which the request message originates, and wherein the second public land mobile network is a home public land mobile network (HPLMN) of the terminal device.

18. The device of claim 14, wherein the first public land mobile network is a first visiting public land mobile network (VPLMN) from which the request message originates, and wherein the second public land mobile network is a second visiting public land mobile network (VPLMN) that the terminal device has roamed into.

19. The device of claim 14, wherein the first identifier comprises an identifier for the first public land mobile network.

20. The device of claim 14, wherein the first identifier comprises an identifier of a network node in the first public land mobile network.

* * * * *